(12) United States Patent
Ahmed

(10) Patent No.: US 12,448,295 B1
(45) Date of Patent: Oct. 21, 2025

(54) FABRICATION OF $SiO_2/Mn_7O_{12}Si/Pb_2SiO_4$ NANOCOMPOSITES USING SOL-GEL METHOD

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/044,142

(22) Filed: Feb. 3, 2025

(51) Int. Cl.
- *C01B 33/20* (2006.01)
- *C01B 33/18* (2006.01)
- *C02F 1/28* (2023.01)

(52) U.S. Cl.
CPC ........... *C01B 33/20* (2013.01); *C01B 33/18* (2013.01); *C02F 1/281* (2013.01); *C01P 2002/60* (2013.01); *C01P 2002/72* (2013.01); *C01P 2004/03* (2013.01); *C01P 2004/51* (2013.01); *C01P 2004/61* (2013.01); *C01P 2006/16* (2013.01)

(58) Field of Classification Search
CPC .......... C01B 33/20; C01B 33/18; C01F 1/281
See application file for complete search history.

(56) References Cited

FOREIGN PATENT DOCUMENTS

| | | |
|---|---|---|
| CN | 1213866 C | 8/2005 |
| CN | 101628707 A | 1/2010 |
| CN | 112295559 A | 2/2021 |
| CN | 118512987 A | 8/2024 |
| WO | WO 2011/108691 A1 | 9/2011 |

OTHER PUBLICATIONS

Jun-Hwan Park, et al., "Facile synthesis of silica-manganese oxide nanocomposites with core-shell structure using surfactant and cosurfactant", Colloids and Surfaces A: Physicochemical and Engineering Aspects, vol. 390, Issues 1-3, Oct. 20, 2011, pp. 199-206 (5 pages).

J. Molera et al., "Manganese crystalline phases developed in high lead glazes during firing", Journal of the European Ceramic Society, Mar. 17, 2022, pp. 4006-4015 (10 pages).

Hongli Wu, et al., "Design strategy of the MnOx catalyst for SCR of NO with NH3: mechanism of lead poisoning and improvement method", Inorganic Chemistry Oct. 6, 2023, vol. 62, Issue 42, pp. 17341-17351 (2 pages).

*Primary Examiner* — James A Fiorito
(74) *Attorney, Agent, or Firm* — Oblon, McClelland, Maier & Neustadt, L.L.P.

(57) ABSTRACT

A porous particulate nanocomposite material containing, as determined by X-ray diffraction: a $Pb_2SiO_4$ crystalline phase; a tetragonal $Mn_7O_{12}Si$ crystalline phase; a hexagonal $SiO_2$ crystalline phase; and, an orthorhombic $SiO_2$ crystalline phase. The porous particulate nanocomposite material, based on the total number of atoms in the nanocomposite material, has an atomic concentration of silicon (Si) of from about 20 to about 35 atom %; an atomic concentration of manganese (Mn) of from about 5 to about 15 atom %; and, an atomic concentration of lead (Pb) of from about 5 to about 15 atom %.

20 Claims, 5 Drawing Sheets

50 →

```
┌─────────────────────────────────────────────────────────────┐
│  Form an aqueous solution of a manganese salt, a lead salt  │
│  and at least one silicate ester of the formula             │
│  R_{(4-x)}Si(OR^1)_x, wherein R and R^1 are each            │— 52
│  independently C_1-C_8 alkyl and x is an integer of from    │
│  1 to 4                                                      │
└─────────────────────────────────────────────────────────────┘
                              ↓
┌─────────────────────────────────────────────────────────────┐
│  Add aqueous ammonia to the aqueous solution and stirring   │
│  the obtained mixture for a duration of from 0.5 to 2 hours │— 54
│  to form a gel                                               │
└─────────────────────────────────────────────────────────────┘
                              ↓
┌─────────────────────────────────────────────────────────────┐
│  Filter the gel, wash the obtained residue with water and   │
│  heat the washed residue under stirring at a temperature of │— 56
│  from 100 to 200°C for a sufficient duration to form a dry  │
│  powder                                                      │
└─────────────────────────────────────────────────────────────┘
                              ↓
┌─────────────────────────────────────────────────────────────┐
│  Calcine the dry powder at a temperature of from 700 to     │— 58
│  1000°C to form the nanocomposite material                  │
└─────────────────────────────────────────────────────────────┘
```

FIG. 1A

# FABRICATION OF SiO$_2$/Mn$_7$O$_{12}$Si/Pb$_2$SiO$_4$ NANOCOMPOSITES USING SOL-GEL METHOD

BACKGROUND

Technical Field

The present disclosure is directed to nanocomposites and, more particularly, to SiO$_2$/Mn$_7$O$_{12}$Si/Pb$_2$SiO$_4$ nanocomposites fabricated using the sol-gel method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Developing advanced nanomaterials is important and challenging for environmental technologists and for biological and medicinal industries. Nanomaterials are used in various fields, such as catalysis, sensing, drug delivery and electronics.

Existing research on nanomaterials primarily focuses on single-component or binary-component nanostructures and thus often neglects the potential of multi-component systems that can provide enhanced functionalities. For example, various studies have explored the independent synthesis of silicon oxide and manganese-based nanomaterials using hydrothermal methods, but these synthetic approaches have been characterized by complex processing steps, high energetic costs, or inconsistent crystalline phase formation.

In addition to this, lead silicate has not found common usage in nanomaterials, potentially due to challenges in achieving its stable integration with other phases.

Accordingly, an object of the present disclosure is directed to a multiphase nanocomposite that combines multiple phases into a single nanocomposite, resulting in a synergistic system, with high crystallinity and uniform morphology.

SUMMARY

In an exemplary embodiment, a porous particulate nanocomposite material is described. The porous particulate nanocomposite material comprises, as determined by X-ray diffraction: a Pb$_2$SiO$_4$ crystalline phase, a tetragonal Mn$_7$O$_{12}$Si crystalline phase, a hexagonal SiO$_2$ crystalline phase, and a orthorhombic SiO$_2$ crystalline phase. In the porous particulate nanocomposite material, based on the total number of atoms in the nanocomposite material: the atomic concentration of silicon (Si) is from about 20 to about 35 atom %; the atomic concentration of manganese (Mn) is from about 5 to about 15 atom %; and, the atomic concentration of lead (Pb) is from about 5 to about 15 atom %.

In some embodiments, the porous particulate nanocomposite material has a volume average crystallite size, as determined by X-ray diffraction, of about 55 to about 65 nm.

In some embodiments, the porous particulate nanocomposite material has a volume average crystallite size, as determined by X-ray diffraction, of about 58 to about 62 nm.

In some embodiments, the porous particulate nanocomposite material is in the form of particles having a heterogeneous surface morphology.

In some embodiments, the porous particulate nanocomposite material, as determined by Scanning Electron Microscopy, includes polygonal particles of a substantially cuboidal shape and aggregates thereof.

In some embodiments, the porous particulate nanocomposite material has a median volume particle size (Dv50) of about 10 to about 200 µm, as determined by Scanning Electron Microscopy.

In some embodiments, the porous particulate nanocomposite material has a median volume particle size (Dv50) of about 50 to about 200 µm, as determined by Scanning Electron Microscopy.

In some embodiments, at least a fraction of the pores have a pore diameter greater than 50 nm, as determined by Scanning Electron Microscopy.

In some embodiments, at least a fraction of the pores have a pore diameter greater than 100 nm, as determined by Scanning Electron Microscopy.

In an exemplary embodiment, a method of preparing the porous particulate nanocomposite material is described. The method comprises: forming an aqueous solution of a manganese salt, a lead salt and at least one silicate ester of the formula R$_{(4-x)}$Si(OR$^1$)$_x$, wherein R and R$^1$ are each independently C$_1$-C$_8$ alkyl and x is an integer of from 1 to 4; adding aqueous ammonia to the aqueous solution and stirring the obtained mixture for a duration of from 0.5 to 2 hours to form a gel; filtering the gel, washing the obtained residue with water, and heating the washed residue under stirring at a temperature of from 100 to 200° C. for a sufficient duration to form a dry powder; and, calcining the dry powder at a temperature of from 700 to 1000° C. to form the nanocomposite material.

In some embodiments, the manganese salt is selected from the group consisting of manganese sulfate (MnSO$_4$), manganese nitrate (Mn(NO$_3$)$_2$), manganese chloride (MnCl$_2$) and manganese acetate (Mn(CH$_3$COO)$_2$).

In some embodiments, the manganese salt is manganese sulfate (MnSO$_4$).

In some embodiments, the lead salt is selected from the group consisting of lead sulfate (PbSO$_4$), lead nitrate (Pb(NO$_3$)$_2$), lead chloride (PbCl$_2$), and lead acetate (Pb(CH$_3$COO)$_2$).

In some embodiments, the lead salt is lead nitrate (Pb(NO$_3$)$_2$).

In some embodiments, R and R$^1$ are each independently C$_1$-C$_6$ alkyl and x is an integer of from 2 to 4.

In some embodiments, the aqueous solution comprises at least one silicate ester selected from the group consisting of: tetramethyl orthosilicate (Si(OCH$_3$)$_4$); methyltriethoxy orthosilicate (Si(CH$_3$)(OC$_2$H$_5$)$_3$); tetraethyl orthosilicate (Si(OC$_2$H$_5$)$_4$); and mixtures thereof.

In some embodiments, the aqueous solution comprises tetraethyl orthosilicate (Si(OC$_2$H$_5$)$_4$).

In some embodiments, the aqueous ammonia is added in a dropwise manner to the aqueous solution.

In some embodiments, the dry powder is calcined at a temperature of from 800 to 900° C. to form the nanocomposite material.

In an exemplary embodiment, a method of immobilizing inorganic contaminants disposed in an aqueous medium is described. The method includes contacting the aqueous medium with the porous particulate nanocomposite material.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1A is a method flowchart for making a $SiO_2/Mn_7O_{12}Si/Pb_2SiO_4$ nanocomposite, according to certain embodiments.

DETAILED DESCRIPTION

Figure 1B:
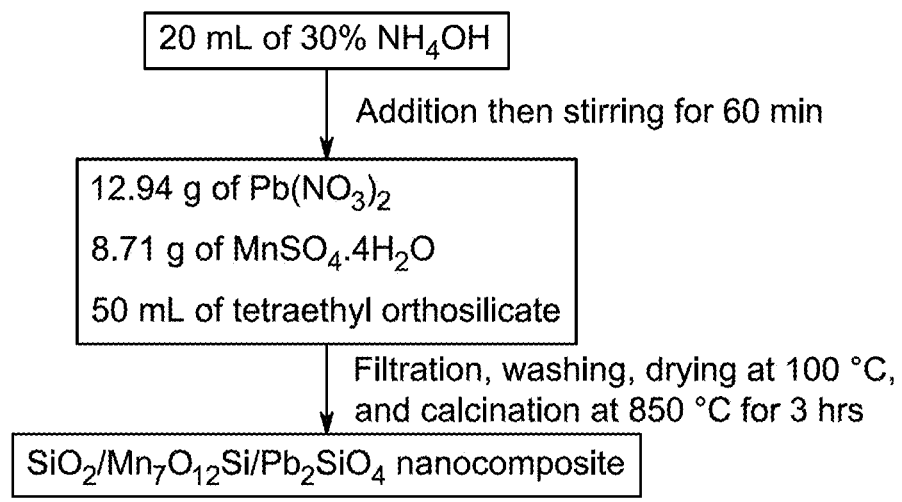
FIG. 1B shows experimental steps for producing the $SiO_2/Mn_7O_{12}Si/Pb_2SiO_4$ nanocomposite, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

In this application, a numerical value interval (i.e., a numerical value range), and, if not specifically stated, an optional numerical value distribution, is considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., 1° C.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term 'room temperature' refers to a temperature range of 23 degrees Celsius (° C.)±2° C. in the present disclosure. As used herein, 'ambient conditions' means the temperature and pressure of the surroundings in which the substance, composition or article is located.

As used herein, the term 'fraction' refers to a numerical quantity which defines a part up to but not including 100 percent or the entirety of the thing in question.

As used herein the term 'disposed' refers to being positioned, placed, deposited, arranged or distributed in a particular manner.

As used herein, the term 'compound' refers to a chemical entity, regardless of its phase-solid, liquid, or gaseous—as well as its state-crude mixture, purified, or isolated.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein with respect to X-ray diffraction analysis, "JCPDS" denotes the Joint Committee on Powder Diffraction Standards.

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

As used herein, the term 'particle' refers to a small object that acts as a whole unit with regard to its transport and properties. As used herein, 'nanoparticles'—sometimes contracted herein to NPs—refers to particles having a particle size of 1 nanometer (nm) to 1000 nm. The particles of the porous nanocomposite may possess various morphological forms. It is envisaged, for example, that particles of the nanocomposite that are fibrous, acicular, spherical, ellipsoidal, cylindrical, bead-like, cubic, cuboid or platelet-like may be present alone or in combination. Moreover, it is envisaged that agglomerates of particles having the same or different morphologies may be present in the nanocomposite.

Unless otherwise stated, the term 'particle size' refers to the largest axis of the particle. In the case of a generally spherical particle, the largest axis is the diameter.

The term 'median volume particle size' (Dv50), as used herein, refers to a particle size corresponding to 50% of the volume of the sampled particles being greater than and 50% of the volume of the sampled particles being smaller than the recited Dv50 value. Similarly, if used, the term 'Dv90' refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term 'nanocomposite' refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material. The definition within the scope of the invention includes porous media and nanodimensional phase(s) differing in properties due to dissimilarities in structure and chemistry. The nanocomposites morphologies that are generally prepared include phase separated systems, intercalated systems, and exfoliated systems.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "atomic concentration" refers to the proportion or percentage of a specific element in a material, calculated based on the number of atoms of that element relative to the total number of atoms present in the material. It is typically expressed as a percentage (%) or as an atomic fraction. This measurement may be determined using the exemplary techniques of X-ray fluorescence (XRF), energy-dispersive X-ray spectroscopy (EDX), or inductively coupled plasma mass spectrometry (ICP-MS). Where stated herein, atomic concentration is determined using energy-dispersive X-ray spectroscopy (EDX).

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term 'pore diameter' refers to pore size of nanocomposite material based on pore classification of the International Union of Pure and Applied Chemistry (IUPAC). The size measurement and nomenclature such as mesopores, micropores, or macropores will be applicable wherever necessary accordingly unless otherwise indicated in the disclosure.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

As used herein, '$C_1$-$C_n$ alkyl' group refers to a monovalent group that contains from 1 to n carbons atoms, that is a radical of an alkane and includes straight-chain and branched organic groups. As such, a '$C_1$-$C_4$ alkyl' group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

The term 'dropwise' as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

As used herein, the term 'sol-gel method' refers to the synthetic process used to produce metal oxide and composite materials by forming a sol through the polymerization of metal salts in a solvent, typically with the help of a chelating agent and an organic compound such as a polyol. The sol is then converted into a gel by the addition of a gelling agent, and, upon heating, the gel undergoes a transformation into a solid metal oxide or composite material.

The term 'sol' as used herein, refers to a colloidal suspension of solid particles in a continuous liquid medium.

As used herein, the term 'gel' refers to a viscoelastic or semi-solid phase that may form when a sol undergoes a transition to a more structured, three-dimensional network. This transition may occur through polymerization or cross-linking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

As used herein, the term 'calcination' refers to a thermal treatment process which is conducted in the absence of, or under a restricted supply of ambient oxygen. This is performed to remove impurities or volatile substances and/or to induce thermal decomposition or a change in the thermally treated material.

A tetragonal crystalline phase refers to a crystal structure in which the unit cell of the lattice has two axes of equal-length and a third axis that is of different length, but wherein all axes are at right angles (90°) to each other. This crystal system may be represented as a square base (with two equal axes) and a height (the third axis) which is different, resulting in a rectangular prism-like shape. The tetragonal crystal structure possesses a four-fold rotational symmetry around its unique axis.

An orthorhombic crystalline phase refers to a crystal structure having three mutually perpendicular axes of unequal lengths ($a \neq b \neq c$). This means the crystal lattice forms a rectangular prism where the edges represent the three axes, all intersecting at 90-degree angles ($\alpha = \beta = \gamma = 90°$).

A hexagonal crystalline phase refers to a crystal lattice where atoms are arranged in a pattern that resembles a honeycomb, with three equal axes in a plane at 120° to each other, and a fourth axis perpendicular to that plane, often with a different length; this arrangement creates a repeating pattern of hexagonal shapes within the crystal.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers.

Aspects of the present disclosure are directed toward a porous particulate nanocomposite material that exhibits enhanced structural and functional properties. The nanocomposite material demonstrates durability in performance, rendering it suitable for various industrial applications and is environmentally compatible. The porous particulate nanocomposite material is prepared in a controlled method from precursors including a manganese salt, a lead salt and at least one silicate ester. The resultant porous nanocomposite has structural diversity and stability characteristics rendering it suitable for advanced applications, such as in fields requiring materials with complex compositions and robust performance.

A porous particulate nanocomposite material is described. The porous particulate nanocomposite material comprises: a $Pb_2SiO_4$ crystalline phase; a tetragonal $Mn_7O_{12}Si$ crystalline phase; a hexagonal $SiO_2$ crystalline phase, and, an orthorhombic $SiO_2$ crystalline phase.

In some embodiments: the tetragonal $Mn_7O_{12}Si$ crystalline phase is double and 8-sided pyramidal, 4-sided prismatic, pyritic, or trapezohedral in shape; the hexagonal $SiO_2$ is prismatic, pinacoidal, dipyramidal, ditrigonal pyramid, trigonal prism, or ditrigonal prismatic in shape; and, the orthorhombic $SiO_2$ crystalline phase is pyramidal, double pyramidal, rhombic pyramidal, or pinacoidal in shape.

The porous particulate nanocomposite material has a volume average crystallite size, as determined by X-ray diffraction, of from about 55 to about 65 nm. In certain embodiments, the porous particulate nanocomposite material has a volume average crystallite size of: from about 55-56 nm, from about 55-57 nm, from about 55-58 nm, from about 55-59 nm, from about 57-60 nm, from about 57-61 nm, from about 57-62 nm, from about 57-63 nm, or from about 57-64 nm, based on the determinations made by the X-ray diffraction.

In some embodiments, the porous particulate nanocomposite material has a volume average crystallite size, as determined by X-ray diffraction, of from about 58 to about 62 nm, for example from about 56 to about 57 nm, from about 57 to about 58 nm, from about 58 to about 59 nm, from about 59 to 60 nm, or preferably from about 60 to about 61 nm based on the determinations made by the X-ray diffraction. In an embodiment, the porous particulate nanocomposite has a volume average crystallite size of 60.24 nm, as determined by X-ray diffraction.

In some embodiments, the porous particulate nanocomposite material is in the form of particles having a heterogeneous surface morphology. In some embodiments, the porous nanocomposite material comprises flake-like plates, granules, platelets, fibers, spheroids, flakes, sheets, and a mixture thereof. In some embodiments, the material comprise plate-like particles and granular particles, at least a fraction of which adhere to or protrude from the plate-like particles. More particularly, certain plate-like structures are in the form of stacked sheets and the granules are irregularly embedded in the matrix. In some embodiments, the porous particulate nanocomposite material comprises, as determined by Scanning Electron Microscopy, polygonal particles of a substantially cuboid shape and aggregates thereof.

In some embodiments, the porous particulate nanocomposite material has a median volume particle size (Dv50) of from about 10 to about 200 μm, as determined by Scanning Electron Microscopy. For example, the porous particulate nanocomposite material may have a median volume particle size (Dv50) of from about 10-20 μm, about 10-25 μm, about 10-30 μm, about 10-m, about 10-40 μm, about 10-45 μm, about 10-50 μm, about 10-55 μm, about 10-60 μm, about 10-65 μm, about 10-70 μm, about 10-75 μm, about 10-80 μm, about 10-85 μm, about 10-90 μm, about 10-95 μm, about 10-100 μm, about 10-105 μm, about 10-110 μm, about 10-115 μm, about 10-120 μm, about 10-125 μm, about 10-130 μm, about 10-135 μm, about 10-140 μm, about 10-145 μm, about 10-150 μm, about 10-155 μm, about 10-160 μm, about 10-165 μm, about 10-170 μm, about 10-175 μm, about 10-180 μm, about 10-185 μm, about 10-190 μm or about 10-195 μm.

In some alternate embodiments, the porous particulate nanocomposite material has a median volume particle size (Dv50) of from about 50 to about 200 μm, as determined by Scanning Electron Microscopy, for example from about 50-60 μm, about 60-70 μm, about 70-80 μm, about 80-90 μm, about 90-100 μm, about 100-110 μm, about 110-120 μm, about 120-130 μm, about 130-140 μm, about 150-160 μm, about 160-170 μm, about 170-180 μm, or about 180-190 μm.

In some embodiments, at least a fraction of the pores of the porous particulate nanocomposite material have a pore diameter greater than 50 nm, as determined by Scanning Electron Microscopy. For example, at least about 10% or at a least about 20% of the pores of the nanocomposite material may have a diameter of from about 50 to about 55 nm, about 55 about 60 nm, about 60 about 65 nm, about 65 about 70 nm, about 70 about 75 nm, about 75 about 80 nm, about 80 about 85 nm, about 85 about 90 nm, about 90 about 95 nm, about 95 about 100 nm, about 100 about 105 nm, about 105 about 110 nm, about 110 about 115 nm, about 115 about 120 nm, about 120 about 125 nm, about 125 about 130 nm, about 130 about 135 nm, about 135 about 140 nm, about 140 about 145 nm, about 145 about 150 nm, about 150 about 155 nm, about 155 about 160 nm, about 160 about 165 nm, about 165 about 170 nm, about 170 about 175 nm, about 175 about 180 nm, about 180 about 185 nm, about 185 about 190 nm, and about 190 about 195 nm.

In some embodiments, at least a fraction of the pores of the porous particulate nanocomposite material have a pore diameter greater than 100 nm, as determined by Scanning Electron Microscopy. For example, at least about 10% or at least about 20% of the pores of the nanocomposite material may have a diameter of from about 100 about 105 nm, about 105 about 110 nm, about 110 about 115 nm, about 115 about 120 nm, about 120 about 125 nm, about 125 about 130 nm, about 130 about 135 nm, about 135 about 140 nm, about 140 about 145 nm, about 145 about 150 nm, about 150 about 155 nm, about 155 about 160 nm, about 160 about 165 nm, about 165 about 170 nm, about 175 about 180 nm, about 180 about 185 nm, about 185 about 190 nm, or about 190 about 195 nm.

In some embodiments, the atomic concentration of silicon (Si) in the nanocomposite material ranges from about 20 to about 35 atom %, for example from about 22 to about 33 atom %, from about 24 to about 31 atom %, or from about 26 to about 29 atom %. In a preferred embodiment, the atomic concentration of silicon (Si) in the nanocomposite material is 3.7 atom % of the total number of atoms.

In some embodiments, the atomic concentration of lead (Pb) in the nanocomposite material ranges from about 5 to about 15 atom %, for example from about 5 to about 12 atom %, from about 6 to about 12 atom %, from about 6 to about 10 atom %, from about 7 to about 10 atom %, from about 7 to about 9 atom % or from about 7 to about 8 atom %. In a preferred embodiment, the atomic concentration of lead (Pb) in the nanocomposite material is 7.4 atom % of the total number of atoms.

In some embodiments, the atomic concentration of manganese (Mn) in the nanocomposite material ranges from about 5 to about 15 atom %, for example from about 7 to about 15 atom %, from about 8 to about 14 atom %, from about 8 to about 13 atom %, from about 8 to about 12 atom %, from about 8 to about 11 atom %, or from about 9 to about 11 atom %. In a preferred embodiment, the atomic concentration of manganese (Mn) in the nanocomposite material is 10.1 atom % of the total number of atoms.

In some embodiments, the atomic concentration of oxygen (O) in the nanocomposite material ranges from about 40 to about 80 atom %, for example from about 50 to about 75 atom %, from about 50 to 70 atom % or from about 50 to about 60 atom %. In a preferred embodiment, the atomic concentration of oxygen (O) in the nanocomposite material is 54.7 atom % of the total number of atoms.

FIG. 1A illustrates a flow chart of a method 50 for preparing the porous particulate nanocomposite material. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes forming an aqueous solution of a manganese salt, a lead salt and at least one silicate ester of the formula $R_{(4-x)}Si(OR^1)_x$, wherein R and $R^1$ are each independently $C_1$-$C_8$ alkyl and x is an integer of from 1 to 4. In some alternate embodiments, the R and R1 are each independently $C_1$-$C_6$ alkyl and x is an integer of from 2 to 4.

In some embodiments, the water of the aqueous solution may be tap water, distilled water, bi-distilled water, deionized water, deionized distilled water, reverse osmosis water or any combination thereof. In a preferred embodiment, the water is distilled water.

In certain embodiments, the molar ratio of Pb:Mn:Si in the aqueous solution formed in step 52, and to which the aqueous ammonia is added at Step 54 of the method illustrated in FIG. 1, may be from about (0.8-1.2):(0.8-1.2):(4.8-7.2), for example from about (0.9-1.1):(0.9-1.1):(5.4-6.6). In certain embodiments, the molar ratio of Pb:Mn:Si in the aqueous solution is about 1:1:6.

Exemplary manganese salts having utility in the present method—and which may be used alone or in combination—include, but are not limited to manganese (II) oxide (MnO), manganese (III) chloride ($MnCl_3$), manganese (IV) oxide ($MnO_2$), manganese (II) carbonate ($MnCO_3$), manganese (II) formate ($Mn(HCOO)_2$), manganese (II) phosphate ($Mn_3(PO_4)_2$), manganese (II) acetate monohydrate ($Mn(CH_3COO)_2 \cdot H_2O$), manganese (II) bromide ($MnBr_2$), manganese (II) iodide ($MnI_2$), manganese (III) acetate ($Mn(CH_3COO)_3$), manganese (II) sulfate monohydrate ($MnSO_4 \cdot H_2O$), manganese (II) pyrophosphate ($Mn_2P_2O_7$), manganese (II) gluconate ($Mn(C_6H_{11}O_7)_2$), manganese (II) lactate ($Mn(C_3H_5O_3)_2$), manganese (II) tartrate ($Mn(C_4H_4O_6)$), manganese (II) malate ($Mn(C_4H_6O_5)$), manganese (III) formate ($Mn(HCOO)_3$), manganese (II) citraconate ($Mn(C_5H_6O_4)$), and manganese (II) salicylate ($Mn(C_7H_6O_3)$). The manganese salt may, in exemplary embodiments, be selected from the group consisting of manganese sulfate ($MnSO_4$), manganese nitrate ($Mn(NO_3)_2$), manganese chloride ($MnCl_2$) and manganese acetate ($Mn(CH_3COO)_2$). In a preferred embodiment, the manganese salt is manganese sulfate ($MnSO_4$).

Exemplary lead salts having utility in the present method—and which may be used alone or in combination—include, but are not limited to, lead sulfate ($PbSO_4$), lead chloride ($PbCl_2$), lead acetate ($Pb(CH_3COO)_2$), lead carbonate ($PbCO_3$), lead oxide (PbO), lead bromide ($PbBr_2$), lead iodide (PbI), lead formate ($Pb(HCO_2)_2$), lead phosphate ($Pb_3(PO_4)_2$), lead lactate ($Pb(C_6H_{11}O_7)_2$), lead citrate ($Pb_3(C_6H_5O_7)_2$), lead tartrate ($Pb(C_4H_4O_6)$), lead malate ($Pb(C_4H_4O_5)_2$), lead stearate ($Pb(C_{18}H_{35}O_2)_2$), lead oxalate ($PbC_2O_4$), lead acetate tetrahydrate ($Pb(CH_3COO)_2 \cdot 4H_2O$), lead chloride hexahydrate ($PbCl_2 \cdot 6H_2O$), lead formate tetrahydrate ($Pb(HCO_2)_2 \cdot 4H_2O$), lead aluminate ($PbAl_2O_4$), lead silicate ($PbSiO_3$), lead bromate ($Pb(BrO_3)_2$), lead iodate ($Pb(IO_3)_2$), lead hydroxide ($Pb(OH)_2$), lead sulfide (PbS), lead chromate ($PbCrO_4$), lead nitrate hexahydrate ($Pb(NO_3)_2 \cdot 6H_2O$), lead bromide hydrate ($PbBr_2 \cdot H_2O$), lead nitrate tetrahydrate ($Pb(NO_3)_2 \cdot 4H_2O$), and lead ferrite ($PbFe_3O_4$). In some embodiments, the lead salt is selected from the group consisting of lead sulfate ($PbSO_4$), lead nitrate ($Pb(NO_3)_2$), lead chloride ($PbCl_2$) and lead acetate ($Pb(CH_3COO)_2$). In a preferred embodiment, the lead salt is lead nitrate ($Pb(NO_3)_2$).

In some embodiments, the silicate ester preferably comprises one or more of tetraethyl orthosilicate, tetrabutyl orthosilicate, methyl orthosilicate silicate ester, ethane propyl silicate ester, trimethoxy silyl propyl silicate ester, trimethoxy silyl propyl silicate ester or a mixture thereof. In some embodiments, the aqueous solution comprises at least one silicate ester selected from the group consisting of tetramethyl orthosilicate ($Si(OCH_3)_4$), methyltriethoxy orthosilicate ($Si(CH_3)(OC_2H_5)_3$), tetraethyl orthosilicate ($Si(OC_2H_5)_4$), and mixtures thereof. In some embodiments, the aqueous solution comprises tetraethyl orthosilicate ($Si(OC_2H_5)_4$).

At step 54, the method 50 includes adding aqueous ammonia to the aqueous solution and stirring the obtained mixture for a duration of from about 0.5 to about 2 hours to form a gel. In some embodiments, the stirring is done for a duration of from about 0.5 to about 1 hour, or from about 0.5 to about 1.5 hour. In one embodiment, the stirring is done for about 1 hour to form the gel. In some embodiments, the aqueous ammonia is added in a dropwise manner to the aqueous solution.

At step 56, the method 50 includes filtering the gel, washing the obtained residue with water and heating the washed residue under stirring at a temperature of from about 100 to about 200° C. for a sufficient duration to form a dry powder. The gel is separated from the aqueous solution it is suspended in, typically using a filter to obtain a residue. Where a filter is used, a pressure differential across the filter may be applied. The obtained residue is then washed with water to remove impurities or any remaining soluble substances. The washed residue is transferred to a suitable container for heating, such as a drying oven, rotary evaporator, or a hot plate with stirring. It is heated at a temperature range of from about 100 to about 200° C. to evaporate the water or other residual solvents. The heating is continued until the residue is fully dried and forms a dry powder: as the residue dessicates it may be subjected to mechanical agitation to break down aggregates.

At step 58, the method 50 includes calcining the dry powder at a temperature of from about 700 to about 1000° C., preferably from about 800 to about 1000° C., and more preferably from about 800 to about 900° C. to form the particulate nanocomposite material. The calcination is carried out by heating it to a high temperature, under a restricted supply of ambient oxygen. This is performed to remove impurities or volatile substances and to incur thermal decomposition.

Typically, the calcination is carried out in a furnace equipped with a temperature control system, which may provide a heating rate of up to about 50° C./min, for example up to about 40° C./min, up to about 30° C./min, up to about 20° C./min, up to about 10° C./min or up to about 5° C./min. In preferred embodiments, the dry powder is calcined for a duration of from about 2 to about 4 hours, such as from about 2.5 to about 3.5 hours or about 3 hours to form the particulate nanocomposite material.

It is not precluded in the present method, that the particles directly obtained from the calcination step may be subjected to at least one of comminution, homogenization or classification in order to moderate the particle size distribution thereof.

The porous particulate nanocomposite material of the present disclosure presents several advantages, in particular an enhanced surface area, which may boost reactivity and efficiency in applications such as catalysis and adsorption. The adsorption capacity of the material may allow for selective surface adsorption or trapping of molecules, making them ideal for applications like water treatment, and pollutant removal.

In some embodiments, a heterogeneous catalyst is provided which includes the porous particulate nanocomposite material. A heterogeneous catalyst is a catalyst that exists in a different phase from the reactants in a chemical reaction. Herein, where the catalyst will comprise a particulate solid, the reactants may be gases and/or liquids. The catalytic process involves the reactants adsorbing onto the surface of the solid catalyst, where the reaction takes place, and then desorbing the products after the reaction. The catalyst itself remains chemically unchanged during the reaction. Where there are no substantial deposits on the nanocomposite and the catalyst maintains its structural integrity during the catalyzed reaction, a heterogenous catalyst comprising the particulate nanocomposite may be reused.

A method of immobilizing inorganic contaminants disposed in an aqueous medium is also described. The method includes contacting the aqueous medium with the porous particulate nanocomposite material as described hereinabove. This method relies on the adsorption of the inorganic contaminants—of which metal ions dissolved in waste water may be mentioned as important examples—onto the porous particulate nanocomposite material.

A method of degrading organic pollutants disposed in an aqueous medium is still further described. The method includes contacting the aqueous medium under actinic irradiation with the porous particulate nanocomposite material as described herein.

Exemplary organic pollutants include, but are not limited to: dyes; phenols; polycyclic aromatic hydrocarbons (PAH); organic herbicides; organic pesticides, including organic algicides, fungicides, bactericides, virucides, insecticides and miticides; and, persistent organic pollutants. For completeness, a persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme (UNEP), 2001 Stockholm Convention on Persistent Organic Pollutants.

The methods of immobilizing inorganic contaminants and of photocatalytic degradation of organic pollutants both require an aqueous medium to be brought into contact with the porous particulate nanocomposite material for a sufficient contact time to permit adsorption of the species concerned. The aqueous medium may be provided as a static volume in which the nanocomposite material is dispersed. In an alternative embodiment, the aqueous medium may be provided as fixed volume in which the nanoparticulate is dispersed but which is subjected to agitation: the nanoparticulate material may be suspended in the volume or may be constrained within a bed or membrane or by a support. In a further non-limiting alternative, the aqueous medium may be provided as a flow which contacts the porous particulate nanocomposite material. In this embodiment, the porous particulate nanocomposite material may need to constrained within a bed or membrane which the aqueous medium contacts as either a perpendicular or tangential (cross-) flow stream.

The following examples are provided solely for illustration and are not to be construed as limitations of the present disclosure, as many variations thereof are possible without departing from the spirit and scope of the present disclosure.

EXAMPLES

The following examples demonstrate a $SiO_2/Mn_7O_2Si/Pb_2SiO_4$ nanocomposite. The examples are provided solely for illustration and are not to be construed as limitations of the present disclosure, as many variations thereof are possible without departing from the spirit and scope of the present disclosure.

Example 1: Synthesis of $SiO_2/Mn_7O_{12}Si/Pb_2SiO_4$ Nanocomposites Using Sol-Gel Method As illustrated in FIG. 1B, the $SiO_2/Mn_7O_{12}Si/Pb_2SiO_4$ nanocomposite was synthesized using the sol-gel method. Initially, 12.94 g of $Pb(NO_3)_2$, 8.71 g of $MnSO_4 \cdot 4H_2O$, and 50 mL of tetraethyl orthosilicate were dissolved in 125 mL of distilled water. To this solution, 20 mL of 30% $NH_4OH$ was added under continuous stirring for 60 min to initiate the gelation process. The resulting product was subsequently filtered, washed thoroughly with distilled water, and dried at 100° C. Finally, the dried material was calcined at 850° C. for 3 hours to obtain the desired $SiO_2/Mn_7O_{12}Si/Pb_2SiO_4$ nanocomposite.

To evaluate the structural, elemental, and morphological properties of the synthesized nanocomposite, it was characterized using X-ray diffraction (XRD), energy-dispersive X-ray spectroscopy (EDX) and scanning electron microscopy (SEM).

Results

Figure 2:
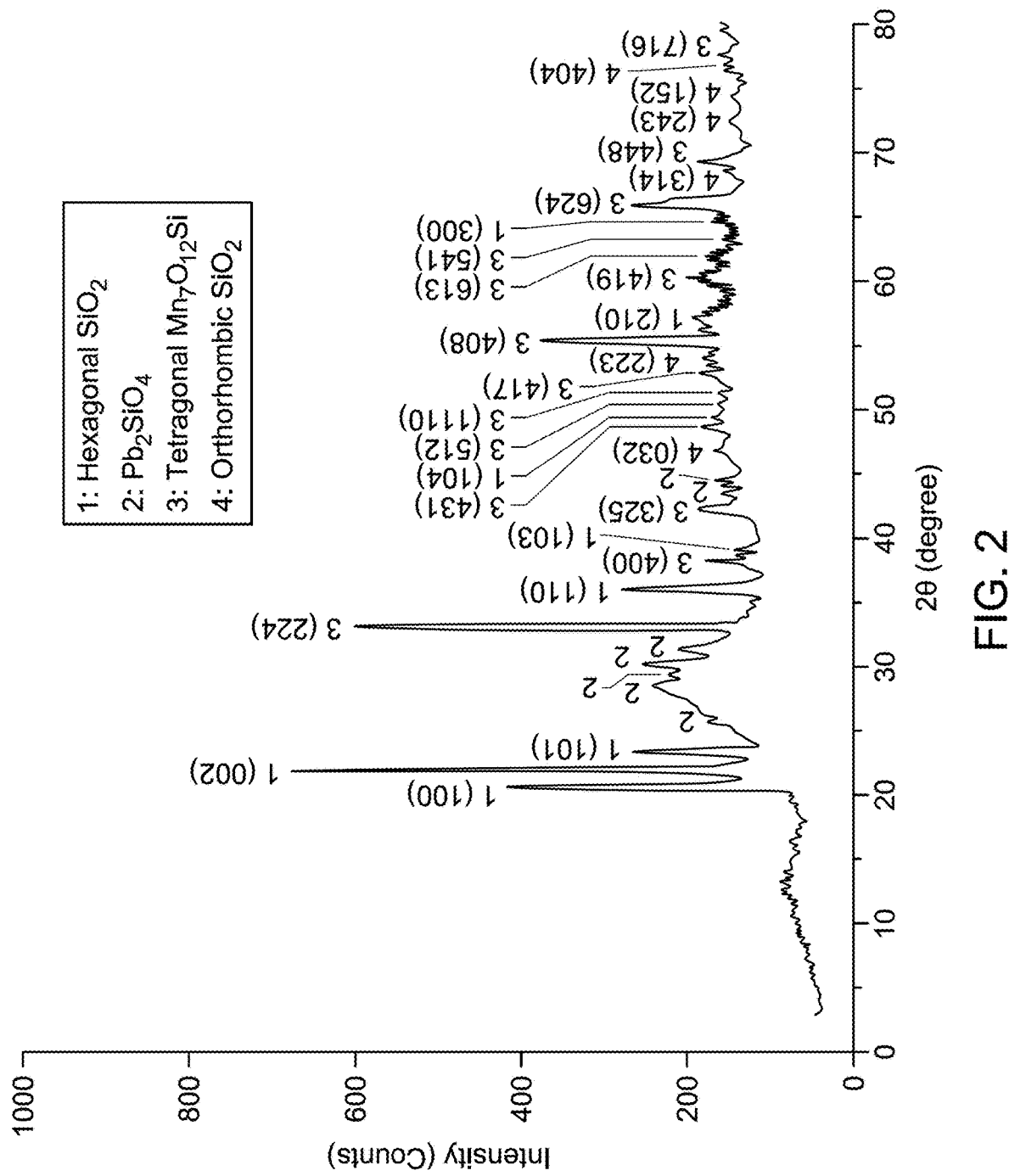
FIG. 2 illustrates the X-ray diffraction (XRD) pattern of the $SiO_2/Mn_7O_{12}Si/Pb_2SiO_4$ nanocomposite, according to certain embodiments.

The X-ray diffraction (XRD) pattern presented in FIG. 2 illustrates the structural and crystallographic properties of the synthesized nanocomposite of Example 1, and these details are summarized in Table 1 herein below. The identified phases include: hexagonal silicon oxide ($SiO_2$) with International Centre for Diffraction Data (ICDD) entry JCPDS-00-001-0378, the disclosure of which is incorporated herein in its entirety; orthorhombic silicon oxide ($SiO_2$) with International Centre for Diffraction Data (ICDD) entry JCPDS-01-071-3839, the disclosure of which is incorporated herein in its entirety; tetragonal manganese silicate ($Mn_7O_{12}Si$) with International Centre for Diffraction Data (ICDD) entry COD-9006542, the disclosure of which is incorporated herein in its entirety; and, lead silicate ($Pb_2SiO_4$) with International Centre for Diffraction Data (ICDD) entry JCPDS-00-030-0725, the disclosure of which is incorporated herein in its entirety. The average crystallite size of the synthesized nanocomposite is 60.24 nm. The diffraction peaks at 2θ angles for hexagonal silicon oxide ($SiO_2$) are observed at 20.56, 21.92, 23.18, 35.99, 39.03, 49.32, 56.98, and 64.64, corresponding to the Miller indices (100), (002), (101), (110), (103), (104), (210), and (300). For orthorhombic silicon oxide ($SiO_2$), the 2θ angles are 46.69, 53.94, 68.31, 72.39, 74.29, and 76.49, with corresponding Miller indices (032), (223), (314), (243), (152), and (404). The tetragonal manganese silicate ($Mn_7O_{12}Si$) exhibits peaks at 2θ angles of 32.94, 38.19, 42.17, 48.57, 50.25, 51.19, 52.68, 55.30, 60.23, 61.69, 63.27, 65.90, 69.26, and 77.43, which correspond to the Miller indices (224), (400), (325), (431), (512), (1 1 10), (417), (408), (419), (613), (541), (624), (448), and (716). For $Pb_2SiO_4$, the observed peaks are at 2θ angles of 25.59, 28.33, 29.27, 30.00, 31.26, 43.23, and 44.38, but the Miller indices are not yet known. The structural analysis confirms the successful synthesis of a nanocomposite comprising multiple crystal phases.

results confirm the successful incorporation of the expected elements into the nanocomposite, reflecting its multi-component nature and alignment with the intended stoichiometric composition.

The composite's thermal stability and multi-phase composition position it as an advanced material for use in adsorption, catalysis, and other high-performance applications across environmental and industrial sectors.

The present disclosure presents the facile fabrication of a novel $SiO_2/Mn_7O_{12}Si/Pb_2SiO_4$ nanocomposite using a sol-gel method that is simple, efficient, and innovative. The novelty of the present disclosure lies in the synthesis of a multi-phase nanocomposite that integrates hexagonal silicon oxide, orthorhombic silicon oxide, tetragonal manganese silicate, and lead silicate, ensuring enhanced crystalline and structural properties. The X-ray diffraction analysis confirms the presence of these phases with a calculated average crystallite size of 60.24 nm, highlighting the purity and crystallinity of the synthesized material. The scanning electron microscope images reveal a rough and porous morphology at 1000× magnification and well-defined cubic and rectangular shapes at 20000× magnification, confirming the crystalline nature and uniformity of the nanocomposite.

TABLE 1

| Phase | Chemical name | Card No. | Crystal system | Average crystallite size of the nanocomposite (nm) |
|---|---|---|---|---|
| $SiO_2$ | Silicon oxide | JCPDS-00-001-0378 | Hexagonal | 60.24 |
| $SiO_2$ | Silicon oxide | JCPDS-01-071-3839 | Orthorhombic | |
| $Mn_7O_{12}Si$ | Manganese silicate | COD-9006542 | Tetragonal | |
| $Pb_2SiO_4$ | Lead silicate | JCPDS-00-030-0725 | Not known yet | |

Figure 3A:
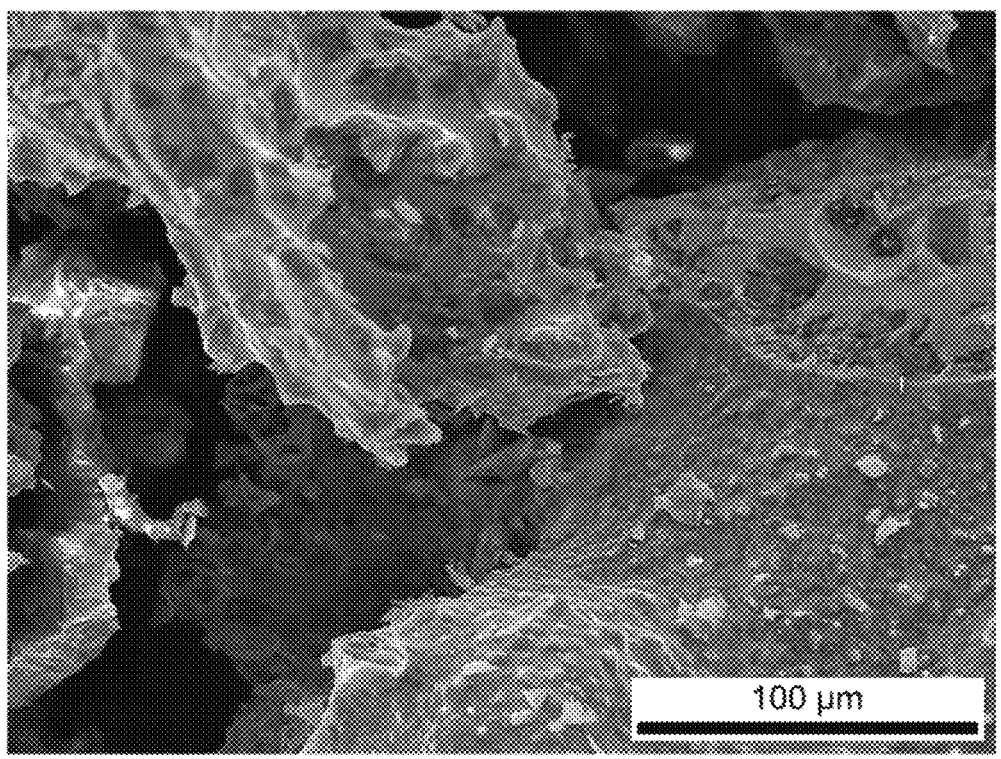
FIGS. 3A-3B shows scanning electron microscope (SEM) images of the $SiO_2/Mn_7O_{12}Si/Pb_2SiO_4$ nanocomposite, according to certain embodiments.
Figure 3B:
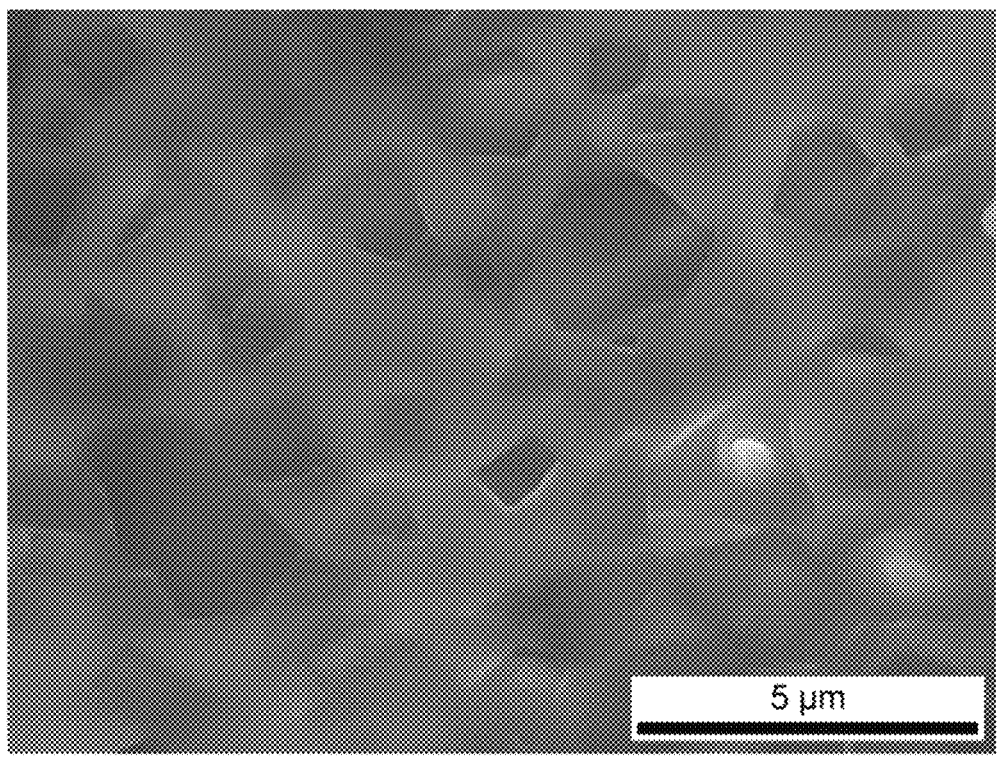

FIG. 3 presents the scanning electron microscope (SEM) images of the synthesized $SiO_2/Mn_7O_{12}Si/Pb_2SiO_4$ nanocomposite at two magnifications, specifically at 1000× (FIG. 3A) and 20000× (FIG. 3B). In FIG. 3A, the morphology reveals a rough and porous structure with aggregated irregular formations, characteristic of a multi-component nanocomposite. The observed shapes include layered formations and larger, irregular, and fractured formations resulting from particle agglomeration. This rough and layered morphology, combined with fine granules, indicates a high surface area, which may enhance the composite's reactivity in applications involving adsorption or catalysis. In FIG. 3B, the higher magnification highlights well-defined polygonal shapes, predominantly cubic and rectangular, which confirm the crystalline nature of the composite. The distinct shapes observed in the SEM image, including flake-like and granular forms, are characteristic of materials synthesized with complex compositions, further emphasizing the composite's structural diversity.

The presence of pores is visible in both FIG. 3A and FIG. 3B. Certain of the pores possess a degree of roundness but equally pores of substantially square or rectangular shape are visible.

Figure 4:
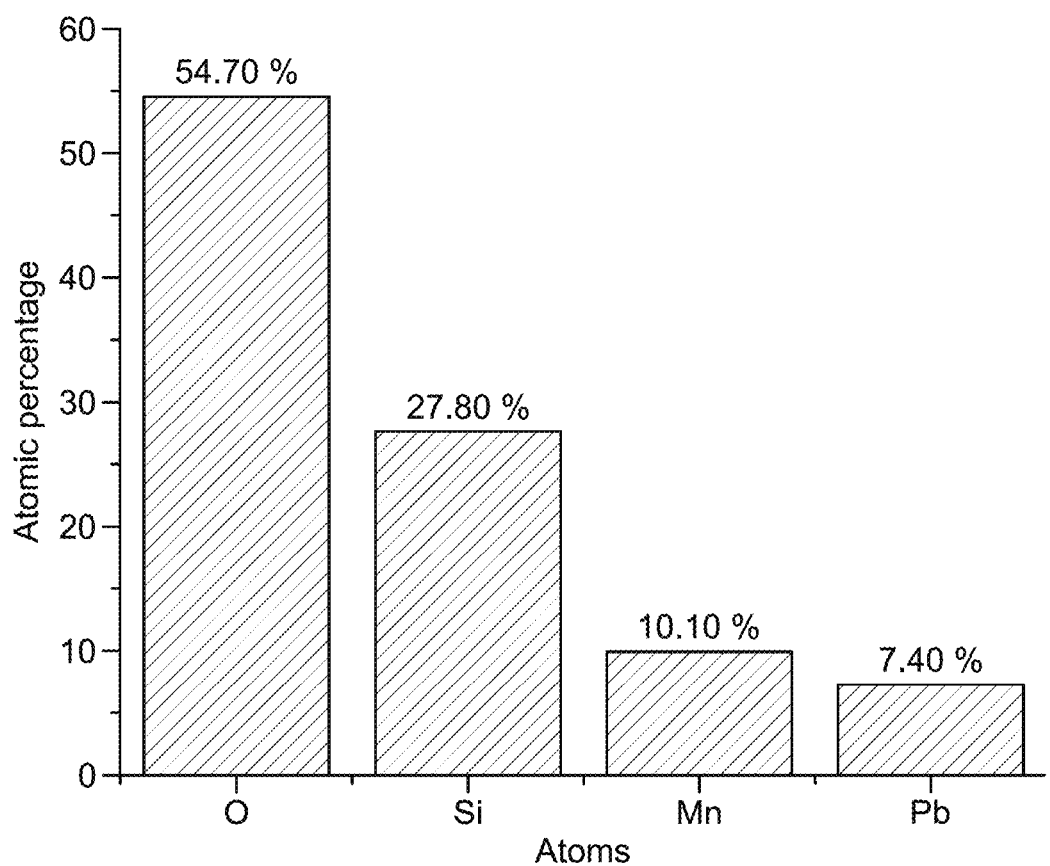
FIG. 4 is a graph showing the atomic percentage distribution of elements in the $SiO_2/Mn_7O_{12}Si/Pb_2SiO_4$ nanocomposite, according to certain embodiments.

FIG. 4 illustrates the distribution of atomic percentages of elements in the synthesized $SiO_2/Mn_7O_{12}Si/Pb_2SiO_4$ nanocomposite of Example 1, as determined by energy dispersive x-ray spectroscopy (EDX). The analysis reveals that oxygen (O) is the predominant element, constituting 54.70 atom % of the total atomic composition. Silicon (Si) accounts for 27.80 atom %, while manganese (Mn) and lead (Pb) contribute 10.10 atom % and 7.40 atom %, respectively. These Energy dispersive X-ray spectroscopy of an exemplary nanocomposite indicates the precise elemental composition, with oxygen at 54.70 atom %, silicon at 27.80 atom %, manganese at 10.10 atom %, and lead at 7.40 atom %, demonstrating the successful integration of all components into the nanocomposite. This innovative approach addresses limitations in existing technologies and offers a versatile material with potential applications in various industrial and environmental domains Numerous modifications and variations of the present disclosure are possible in light of the above teachings. It is, therefore, to be understood that within the scope of the appended claims, the invention may be practiced otherwise than as specifically described herein.

The invention claimed is:
1. A porous particulate nanocomposite material comprising, as determined by X-ray diffraction:
 a $Pb_2SiO_4$ crystalline phase;
 a tetragonal $Mn_7O_{12}Si$ crystalline phase;
 a hexagonal $SiO_2$ crystalline phase; and,
 a orthorhombic $SiO_2$ crystalline phase,
wherein, based on the total number of atoms in the nanocomposite material:
 the atomic concentration of silicon (Si) is from about 20 to about 35 atom %;
 the atomic concentration of manganese (Mn) is from about 5 to about 15 atom %; and,
 the atomic concentration of lead (Pb) is from about 5 to about 15 atom %.

2. The porous particulate nanocomposite material according to claim 1, having a volume average crystallite size, as determined by X-ray diffraction, of from about 55 to about 65 nm.

3. The porous particulate nanocomposite material according to claim 1, having a volume average crystallite size, as determined by X-ray diffraction, of from about 58 to about 62 nm.

4. The porous particulate nanocomposite material according to claim 1, wherein the material is in the form of particles having a heterogeneous surface morphology.

5. The porous particulate nanocomposite material according to claim 1, comprising, as determined by Scanning Electron Microscopy, polygonal particles of a substantially cuboid shape and aggregates thereof.

6. The porous particulate nanocomposite material according to claim 1, having a median volume particle size (Dv50) of from about 10 to about 200 μm, as determined by Scanning Electron Microscopy.

7. The porous particulate nanocomposite material according to claim 1, having a median volume particle size (Dv50) of from about 50 to about 200 μm, as determined by Scanning Electron Microscopy.

8. The porous particulate nanocomposite material according to claim 1, wherein at least a fraction of the pores have a pore diameter greater than 50 nm, as determined by Scanning Electron Microscopy.

9. The porous particulate nanocomposite material according to claim 1, wherein at least a fraction of the pores have a pore diameter greater than 100 nm, as determined by Scanning Electron Microscopy.

10. A method for preparing the porous particulate nanocomposite material as defined in claim 1, the method comprising:
forming an aqueous solution of a manganese salt, a lead salt and at least one silicate ester of the formula $R_{(4-x)}Si(OR^1)_x$, wherein R and $R^1$ are each independently $C_1$-$C_8$ alkyl and x is an integer of from 1 to 4;
adding aqueous ammonia to the aqueous solution and stirring the obtained mixture for a duration of from 0.5 to 2 hours to form a gel;
filtering the gel, washing the obtained residue with water and heating the washed residue under stirring at a temperature of from 100 to 200° C. for a sufficient duration to form a dry powder; and,
calcining the dry powder at a temperature of from 700 to 1000° C. to form the nanocomposite material.

11. The method according to claim 10, wherein the manganese salt is selected from the group consisting of manganese sulfate ($MnSO_4$), manganese nitrate ($Mn(NO_3)_2$), manganese chloride ($MnCl_2$) and manganese acetate ($Mn(CH_3COO)_2$).

12. The method according to claim 11, wherein the manganese salt is manganese sulfate ($MnSO_4$).

13. The method according to claim 10, wherein the lead salt is selected from the group consisting of lead sulfate ($PbSO_4$), lead nitrate ($Pb(NO_3)_2$), lead chloride ($PbCl_2$) and lead acetate ($Pb(CH_3COO)_2$).

14. The method according to claim 13, wherein the lead salt is lead nitrate ($Pb(NO_3)_2$).

15. The method according to claim 10, wherein R and $R^1$ are each independently $C_1$-$C_6$ alkyl and x is an integer of from 2 to 4.

16. The method according to claim 10, wherein the aqueous solution comprises at least one silicate ester selected from the group consisting of: tetramethyl orthosilicate ($Si(OCH_3)_4$); methyltriethoxy orthosilicate ($Si(CH_3)(OC_2H_5)_3$); tetraethyl orthosilicate ($Si(OC_2H_5)_4$); and, mixtures thereof.

17. The method according to claim 10, wherein the aqueous solution comprises tetraethyl orthosilicate ($Si(OC_2H_5)_4$).

18. The method according to claim 10, wherein the aqueous ammonia is added in a dropwise manner to the aqueous solution.

19. The method according to claim 10, wherein the dry powder is calcined at a temperature of from about 800 to about 900° C. to form the nanocomposite material.

20. A method of immobilizing inorganic contaminants disposed in an aqueous medium, the method comprising contacting the aqueous medium with the porous particulate nanocomposite material as defined in claim 1.

* * * * *